United States Patent
Hoppe et al.

(10) Patent No.: US 7,405,525 B2
(45) Date of Patent: Jul. 29, 2008

(54) METHOD FOR THE CONTROL OF AN ELECTRIC MACHINE AND/OR DEVICE FOR THE CONTROL THEREOF

(75) Inventors: Thomas Hoppe, Altdorf (DE); Tibor Seres, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 80 days.

(21) Appl. No.: 10/571,726

(22) PCT Filed: Sep. 15, 2004

(86) PCT No.: PCT/EP2004/010343

§ 371 (c)(1),
(2), (4) Date: Mar. 14, 2006

(87) PCT Pub. No.: WO2005/027322

PCT Pub. Date: Mar. 24, 2005

(65) Prior Publication Data

US 2007/0029960 A1    Feb. 8, 2007

(30) Foreign Application Priority Data

Sep. 15, 2003  (DE) ............................... 103 42 562
Sep. 8, 2004   (DE) ....................... 10 2004 043 506

(51) Int. Cl.
*H02P 1/00* (2006.01)

(52) U.S. Cl. .................. 318/135; 318/432; 318/560; 318/632

(58) Field of Classification Search ............ 318/135, 318/432, 568.18, 560, 609
See application file for complete search history.

(56) References Cited

U.S. PATENT DOCUMENTS 3,596,070 A * 7/1971 McCool et al. ............. 700/275
4,381,478 A * 4/1983 Saijo et al. .................. 318/135
4,698,576 A * 10/1987 Maresca ..................... 318/687

(Continued)

FOREIGN PATENT DOCUMENTS

WO    WO 97/46924 A1    12/1997

OTHER PUBLICATIONS

Schulz S. E. et al.: "High Performance Digital PI Current Regulator for EV Switched Reluctance Motor Drives", Conference Record of the 2002 IEEE Industry Applications Conference. 37th IAS Annual Meeting. Pittsburgh, PA, Oct. 13-18, 2002, New York, NY: IEEE, US, vol. 1 of 4. conf. 37, Oct. 13, 2002, pp. 1617-1624, XP010610096, ISBN: 0-7803-7420-7.

(Continued)

*Primary Examiner*—Paul Ip
(74) *Attorney, Agent, or Firm*—Henry M. Feiereisen; Ursula B. Day

(57) ABSTRACT

The invention relates to a method for the control of an electric machine (5), wherein a control unit (1) comprises a parameterisable speed control (26) and a parameterisable additional control (28). The electric machine (5) is provided in order to modify the position of a displaceable machine part (7,8). The position (29) of the displaceable machine part (7,8) is detected and at least one parameter (31) of the speed control (26) and/or at least one parameter (33) of the additional control (28) is modified according to the position (29) of the displaceable machine part (7,8).

5 Claims, 1 Drawing Sheet

U.S. PATENT DOCUMENTS

| | | | | |
|---|---|---|---|---|
| 4,900,992 | A * | 2/1990 | Sekizawa et al. | 318/135 |
| 5,298,841 | A * | 3/1994 | Katayama et al. | 318/268 |
| 5,623,189 | A * | 4/1997 | Hemmer | 318/432 |
| 5,783,915 | A * | 7/1998 | Shida et al. | 318/135 |
| 6,002,234 | A * | 12/1999 | Ohm et al. | 318/729 |
| 6,118,245 | A * | 9/2000 | Sienz et al. | 318/687 |
| 6,188,190 | B1 * | 2/2001 | Arakawa | 318/560 |
| 6,198,246 | B1 * | 3/2001 | Yutkowitz | 318/561 |
| 6,215,260 | B1 * | 4/2001 | Hinds | 318/135 |
| 6,259,221 | B1 * | 7/2001 | Yutkowitz | 318/561 |
| 6,281,650 | B1 * | 8/2001 | Yutkowitz | 318/561 |
| 6,515,440 | B2 * | 2/2003 | Koga et al. | 318/135 |
| 6,518,718 | B2 * | 2/2003 | Koga et al. | 318/38 |
| 6,943,513 | B2 * | 9/2005 | Hayasaka | 318/432 |
| 6,943,522 | B2 * | 9/2005 | Nagaoka et al. | 318/632 |
| 7,026,779 | B2 * | 4/2006 | Eba | 319/609 |
| 7,205,743 | B2 * | 4/2007 | Iwashita et al. | 318/568.18 |
| 2004/0090198 | A1 * | 5/2004 | Kaku et al. | 318/432 |
| 2004/0189227 | A1 * | 9/2004 | Hayasaka | 318/432 |
| 2005/0052175 | A1 * | 3/2005 | Takahashi et al. | 324/71.1 |
| 2005/0057202 | A1 * | 3/2005 | Hoppe | 318/135 |
| 2005/0189898 | A1 * | 9/2005 | Muroi | 318/560 |
| 2006/0132078 | A1 * | 6/2006 | Iwashita et al. | 318/568.18 |
| 2007/0007920 | A1 * | 1/2007 | Tsuruta et al. | 318/432 |

OTHER PUBLICATIONS

Faa-Jeng Lin et al.: "On-line Gain Tuning Using RFNN for Linear Synchronous Motor", 32$^{nd}$ Annual IEEE Power Electronics Specialists Conference. PESC 2001. Conference Proceedings. Vancouver, Canada, Jun. 17-21, 2001, Annual Power Electronics Specialists Conference, New York, NY: IEEE, US, vol. 1 of 4, conf. 32, Jun. 17, 2001, pp. 766-771, XP010559322, ISBN: 0-7803-7067-8.

Habib M.K. ED—Institute of Electrical and Electronics Engineers: "Designing Fuzzy Logic Controllers for DC Servomotors Supported by Fuzzy Logic Control Development Environment", IECON'01. Proceedings of the 27$^{th}$ Annual Conference of the IEEE Industrial Electronics Society. Denver, CO, Nov. 29-Dec. 2, 2001, New York, NY: IEEE, US, vol. 1 of 3, conf. 27, Nov. 29, 2001, pp. 2093-2098, XP010571740, ISBN: 0-7803-7108-9.

* cited by examiner

METHOD FOR THE CONTROL OF AN ELECTRIC MACHINE AND/OR DEVICE FOR THE CONTROL THEREOF

BACKGROUND OF THE INVENTION

The invention relates to a method for controlling an electrical machine, and to an apparatus for controlling it. A control unit is used in a method for controlling an electrical machine. The control unit is advantageously configurable. The control unit has, for example, a current regulator, a speed regulator or a further additional regulator. At least one of these regulators can be configured by means of at least one parameter. Regulators, for example, have different control elements. Control elements are, for example, P elements (amplification elements), D elements (differential elements), I elements (integrated elements) etc. Control elements such as these have parameters such as gain factors P or else differential time constants $T_D$, or else integrating time constants $T_i$. Timers, gain factors and/or time constants such as these are examples of parameters.

The electrical machine is intended, for example, for the movement of a machine part. The machine part is, for example, a part of a machine tool, of a production machine or of an automatic handling machine. The machine part may, however, also be a part of the electrical machine itself, for example a rotor of a rotating electrical machine or else a primary part or a secondary part of a linear motor. In the case of a linear motor, either the primary part or else the secondary part can be moved linearly. The secondary part, which has permanent magnets, is generally stationary, and the primary part, which has at least one winding through which a current can be passed, can be moved linearly.

The electrical machine is thus either a rotating electrical machine or a linear motor. In the case of a rotating electrical machine, the moving machine part is, for example, driven directly by the electrical machine, or else via a gearbox or via a means for power transmission, such as a toothed belt or the like.

The constraints for movement (linear or rotational) of the electrical machine may vary depending on the position of the machine part which can be moved. One constraint is, for example, a coefficient of friction, which is dependent on the position of the machine part. In the case of a linear motor, or else in the case of a rotated electrical synchronous machine with permanent-magnet excitation, for example, it is also possible for the permanent magnets on the secondary part of the linear motor or on the rotor to have different magnetization. The magnetization is thus an example of a further constraint. The resultant electromagnetic force EMK differs, depending on the magnetization. In the case of a linear motor, for example, the electromagnetic force EMF also differs because the primary part moves over a section of the secondary part which is free of any cover protecting this secondary part.

According to the prior art, the parameters for controlling a control unit for the electrical machine must be set in such a way that, on average, they produce an optimum control setting for all positions of the electrical machine. This means that the electrical machine is configured optimally with respect to the control system in no position, or only in a small number of positions, of a moving machine part.

SUMMARY OF THE INVENTION

One object of the present invention is to allow improved configuration of the control system for an electrical machine.

According to one aspect of the present invention, a method for controlling an electrical machine, with a control unit having a configurable speed regulator and/or a configurable additional regulator, and with the electrical machine being provided in order to vary a position of a movable machine part, wherein the position of the movable machine part is detected, at least one parameter of the speed regulator and/or at least one parameter of the additional regulator are/is varied as a function of the position of the movable machine part.

According to another aspect of the present invention an apparatus for controlling an electrical machine includes a control system having a configurable speed regulator and a configurable additional regulator, with the electrical machine being provided in order to vary the position of the machine part, wherein the position of the machine part is measurable, wherein at least one parameter of the speed regulator and/or at least one parameter of the additional regulator can be varied as a function of the position of the machine part.

In the case of a method for controlling an electrical machine, with a control unit having a configurable speed regulator and/or a configurable additional regulator and the electrical machine being provided in order to vary a position of a movable machine part, with the position of the movable part being detected, one parameter of the speed regulator and/or at least one parameter of the additional regulator is varied as a function of the position of the movable machine part.

The movable machine part is, for example, a part of a machine tool (for example a milling head) or of a production machine (for example a worm feed of a plastic injection-molding machine which is a production machine), or of an automatic handling machine (for example gripping tongs). Alternatively, for example, the movable machine part is a rotor of a rotating electrical motor, or a primary part of a linear motor.

Because of the requirements for a drive process, that is to say the drive for a machine part by means of which its position can be varied, it is advantageous to operate the speed regulator for the electrical machine or some other regulator for the electrical machine with varying parameters matched to a movement position. At least one parameter of a regulator is thus dependent on the position. In the case of a rotating motor, the speed regulator is the rotation speed regulator. The advantageous change as described above of at least one parameter is also advantageous in the case of a position control loop. The position control loop is used to control the position of a movable machine part. The variation of at least one parameter as a function of the position of the movable machine part makes it possible to avoid having to select an averaged parameter set as a joint compromise between all the requirements of a system to be controlled.

By way of example, a movement measurement system measures the movement position of the movable machine part. The measured movement position is used to readjust at least one control parameter. The control parameter is preferably an optimum value for a specific physical position of a movement. There is therefore no need to satisfy the various requirements for a regulator or its control response over the entire movement distance with a single parameter set. The movement distance is, for example, the distance which the primary part of the linear motor travels over with respect to the secondary part of the linear motor. A further example of the movement distance is the 360° of one revolution of a rotor of a rotating electric motor which is also a rotating electrical machine.

In one advantageous refinement, the additional regulator is at least one of the regulator types listed in the following text:

a position regulator, a traction regulator, a torque regulator and/or a pilot control. The pilot control is in this case a control loop which may be designed to be either in a closed or open form.

In a further advantageous refinement, the electrical machine is in the form of a linear motor. The linear motor has a primary part and a secondary part, with either the primary part or the secondary part being a movable part of the linear motor. At least one parameter of the speed regulator and/or at least one parameter of the additional regulator are/is varied as a function of the position of the movable part. For example, if the linear motor has a secondary part with a cover and if this cover is not passed over the entire surface of the secondary part, then the electromagnetic force EMF varies as a function of whether the secondary part does or does not have a cover at the position of the primary part. The variation in the electromagnetic force EMF is position-dependent, so that at least one parameter for speed control or for additional control of the linear motor can be set as a function of whether the primary part is located in an area in which the secondary part has a cover, or else has no cover at that point. One example of the parameter is the parameter for the electromagnetic force EMF.

In a further advantageous refinement, a function or a table is used to vary the parameter for a control system. The function is a function of position. The position relates, for example, to a position of the primary part of a linear motor, or to the position of a rotor of a rotating electrical machine, or else to the position of a machine part of a machine, in which case, by way of example, the machine is a production machine, a machine tool or an automatic handling machine. The position of the machine part is important, for example, because the machine part is subject to the different coefficients of friction as a function of the position, so that, for example, a gain parameter in the control system can compensate for higher friction in certain areas of a movement path. If the variation of one or more parameters in the control system (for example speed regulator and/or additional regulator) is carried out by means of a table, then an association between a position and an associated parameter is produced in the table.

The use of a function or of a sufficiently detailed table also makes it possible to avoid a jerking response which can result from switching of one parameter. The use of the function and/or of the table makes it possible to achieve uniform changes in a parameter. This is used to avoid sudden changes in an output signal from a regulator.

In one advantageous refinement of the invention, a reference run is carried out for the electrical machine in order to determine the position-dependent parameters. The machine response can be recorded by means of the reference run, which can be carried out in a reference time. By way of example, the magnetic field caused by the permanent magnets is measured during the reference run. A table and/or a function in which information is stored relating to the position of the movable machine part at which a specific parameter value can be set for a control system is generated during and/or after the reference run as a function of the strength of the magnetic field measured during the reference run. The necessary parameter values are calculated in advance for this purpose.

In a further advantageous refinement, the parameter is thus a physical parameter which, in particular, is a magnetic field parameter and is dependent on the position of the machine part. The physical parameter is measured as a function of the position of the machine part. The parameter or parameters of one or more regulators is or are obtained as a function of the position of the machine part. This is achieved, for example as already described above, by means of a function of a table. The dependency in this case relates to the dependency of the physical parameter, so that one or more parameters of one or more regulators is or are varied as a function of the values of the physical parameters. As already described, a physical parameter is a parameter which relates, for example, to the magnetic field which is produced by means of permanent magnets. The permanent magnets are not always magnetized with a uniform strength so that this would result in a machine response without any variation in the regulator parameters, which is disadvantageous for many applications because the electrical machine also reacts differently, for example to the same current levels and frequencies, as a function of the position. However, different EMF also results, for example, from a secondary part of a linear motor having a cover over a certain movement section and having no cover over another movement section which is used, for example, for servicing purposes or for tool changing in the case of a machine tool. The cover is advantageously magnetic, so that it automatically adheres to the secondary part.

The invention relates not only to a method but also to an apparatus for controlling an electrical machine. The control system has a configurable speed regulator and/or configurable additional regulator. The additional regulator is, for example, a position regulator, a traction regulator or a torque regulator. The additional regulator can also be understood to be a pilot control. The electrical machine is intended to vary the position of a movable machine part. A movable machine part is, for example, a part of the electrical machine such as the primary part of a linear motor or the rotor of a rotating synchronous machine with permanent-magnet excitation. A further example of a machine part is a tool of a machine tool which, for example, can be driven by the electrical machine, by means of a gearbox. The position of the machine part can be detected by means of a position sensor. At least one parameter of the speed regulator and/or at least one parameter of the additional regulator can be varied as a function of the position of the movable machine part. This results in the advantages already described above. This apparatus for control purposes can also be used to carry out the method as described above for controlling an electrical machine.

The apparatus for controlling the electrical machine is, for example, an NC controller, a CNC controller, a PLC controller, a personal computer (PC) or the like. In the case of a drive which has an electrical machine and a converter, the control is, for example, also integrated in the open-loop or closed-loop control of the converter.

BRIEF DESCRIPTION OF THE DRAWING

Exemplary embodiments of the invention will be explained with reference to the attached drawings, in which.

DETAILED DESCRIPTION OF PREFERRED EMBODIMENTS

Figure 1:
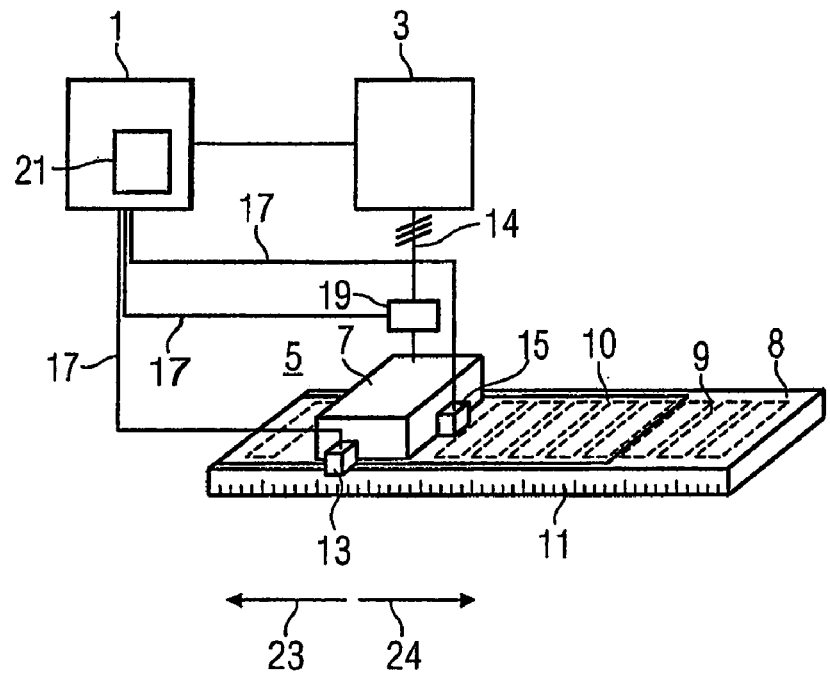
FIG. 1 shows a schematic illustration of a linear motor with a control unit for carrying out the method according to the invention.

The illustration in FIG. 1 shows a control unit 1. By way of example, the control unit 1 can be integrated in the production machine, in a machine tool or in an automatic handling machine. These machines or automatic devices are not illustrated in FIG. 1. A converter circuit 3 can be driven by means of the control unit 1. The converter circuit 3 is provided to pass current through a linear motor 5, as an example of an electrical machine. The linear motor 5 has, as is known, a primary part 7 and a secondary part 8. The primary part 7 can be moved in the movement directions 23 and 24. A linear scale 11 and a position sensor 13 are also illustrated, schematically. A sensor 15 for measurement of the magnetic field of the secondary part 8, which has permanent magnets 9, is provided on or in a power transmission interface of the linear motor, that is to say in the area of an airgap between the primary part 7 and the secondary part 8. The secondary part 8 also has a cover 10, but this does not extend over the entire area of the secondary part 8. Further sensors such as a sensor for recording the speed, as are normal in the case of electrical machines and linear motors, are not illustrated in FIG. 1, for the sake of clarity. However, the speed detection may, for example, also be derived directly from the waveform of the magnetic field at the location of the sensor 15. This has the advantage that, if a sensor such as this is already provided on an electrical machine or in a primary motor, this sensor can also be used as a position sensor. The position sensor 13 and the sensor 15 are connected to the control unit 1 via a data cable 17. The control unit 1, which is also intended in particular to provide speed control, position control and/or current control, forms a parameter for at least one of the above-mentioned controllers, at least from the values of the sensor 15. By way of example, a current signal is also required for controlling the linear motor 5. The current signal is produced by a current transformer 19. The current transformer 19 is used to measure the current which is applied to the primary part 7 via a current line 14 through the converter circuit 3.

The control unit 1 has a memory 21. This memory 21 is used to store parameters which relate in particular to the electromagnetic force EMF. The primary part is moved in at least one of the two movement directions 23, 24 during a reference run of the linear motor. During the reference run, the sensor 15 records measurement data. The measurement data is processed to form at least one parameter. The parameter is stored and is used to control the electrical machine, that is to say the linear motor.

Figure 2:
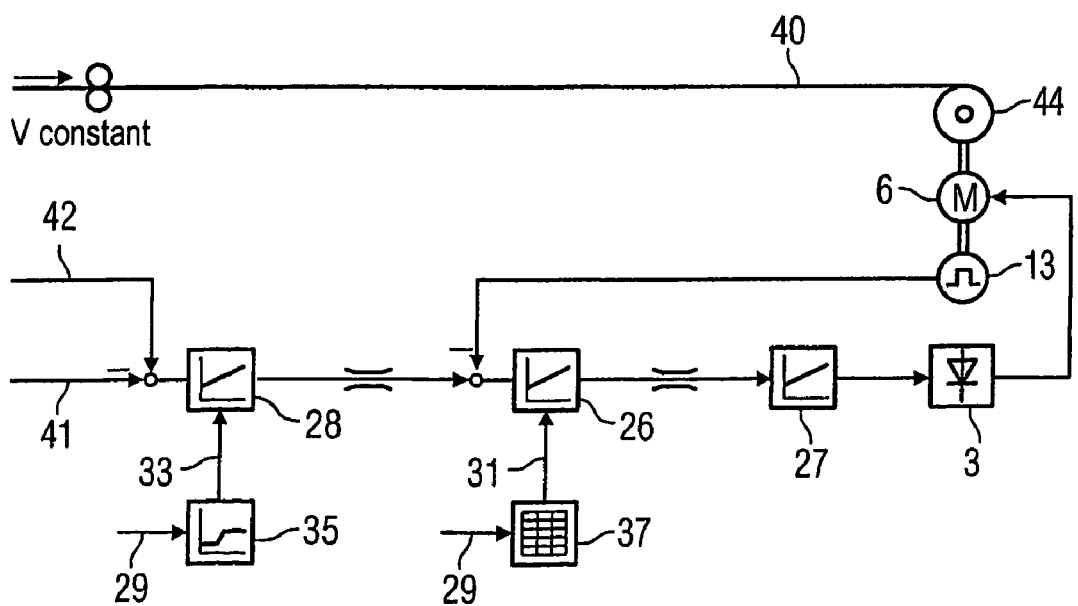
FIG. 2 shows one example of rotation speed control, which is combined with position control as an additional regulator.

The illustration in FIG. 2 shows a control scheme for a winder 44. A material strip 40 can be wound on the winder 44. The winder 44 can be driven by means of an electrical machine 6. The rotary movement of the electrical machine 6 is detected by means of a position sensor 13. The control system for the electrical machine 6 has a rotation speed regulator 26 and a current regulator 27. The current regulator 27 supplies a current signal to a converter circuit 3. The converter circuit 3 is a power section for operation of the electrical machine 6. The control scheme as shown in FIG. 2 also has a position regulator 28. The input signal to the position regulator 28 is the difference between an actual position value 41 and a set position value 42. Both the position regulator 28 and the rotation speed regulator 26 have parameters. A parameter 33 relating to a function 35 can be supplied to the position regulator 28. A parameter value is plotted against a position in the function 35. The parameter 33 can therefore be selected by supplying a position signal 29. In the rotation speed regulator 26, the parameter 31 is selected by means of a table 37. A stored parameter value 31 can be selected from the table 37 for a known position signal 29, with the selected parameter value being made available to the rotation speed regulator. Both the signal from the position sensor and the output signal from the position regulator 28 are therefore used as input signals to the rotation speed regulator.

What is claimed is:

1. A method for controlling a linear motor having a primary movable machine part comprising windings and a secondary fixed machine part comprising permanent magnets, comprising the steps of:
   moving the movable machine part along a movement path which is partially covered;
   measuring a magnetic field produced by the permanent magnets at a position along the movement path; and
   setting a position-dependent parameter of a control unit controlling a speed or position of the movable machine part based on the measured magnetic field.

2. The method as claimed in claim 1, wherein the control unit comprises at least one regulator selected from the group consisting of position regulator, traction regulator, torque regulator, and pilot control.

3. The method as claimed in claim 1, wherein the position-dependent parameter is stored in a memory as a function or a table.

4. The method as claimed in claim 1, and further comprising the step of executing a reference run of the electrical machine to determine the position-dependent parameter.

5. An apparatus for controlling a linear motor having a primary movable machine part comprising windings and a secondary fixed machine part comprising permanent magnets, said permanent magnets having a cover which modifies a magnetic field along a section of a movement path of the movable machine part comprising:
   a sensor for measuring the magnetic field along the movement path;
   a memory unit for storing position-dependent parameters derived from the measured magnetic field; and
   a control unit for controlling a speed or position of the movable machine part based on one or more of the position-dependent parameters stored in the memory unit.

* * * * *